United States Patent [19]

Hargis et al.

[11] Patent Number: 5,216,181
[45] Date of Patent: Jun. 1, 1993

[54] LIQUID TELECHELIC POLYMERS HAVING HIGH 1,4-DIENE STRUCTURE

[75] Inventors: I. Glen Hargis, Tallmadge; Hubert J. Fabris, Akron; John A. Wilson, Akron; Russell A. Livigni, Akron, all of Ohio

[73] Assignee: GenCorp Inc., Fairlawn, Ohio

[21] Appl. No.: 754,233

[22] Filed: Aug. 26, 1991

Related U.S. Application Data

[63] Continuation of Ser. No. 200,286, May 31, 1988.

[51] Int. Cl.$^5$ ............................................. C07D 301/00
[52] U.S. Cl. ................................. 549/513; 526/177; 562/551; 562/595; 564/14; 564/485; 568/57; 568/66; 568/857; 568/867; 585/507
[58] Field of Search ............... 562/595, 551; 526/177; 568/66, 57, 857, 867, 878; 564/509, 14, 485; 570/189; 549/513; 585/507

[56] References Cited

U.S. PATENT DOCUMENTS

| | | | |
|---|---|---|---|
| 3,278,508 | 10/1966 | Kahle et al. | 526/176 |
| 3,321,487 | 5/1967 | Chini et al. | 260/34.6 |
| 3,388,178 | 6/1968 | Kamienski . | |
| 3,578,642 | 5/1971 | Mueller et al. | 260/82.1 |
| 3,629,213 | 12/1971 | Onishi et al. | 252/431 R |
| 3,664,989 | 5/1972 | Petrov et al. | 526/175 |
| 3,725,301 | 4/1973 | Mueller et al. | 252/431 R |
| 3,862,100 | 1/1975 | Halasa et al. | 526/181 |
| 3,899,474 | 8/1975 | Goldenberg et al. | 260/94.3 |
| 3,928,302 | 12/1975 | Hargis et al. | 260/94.3 |
| 4,041,088 | 8/1977 | Bach et al. | 260/668 B |
| 4,049,732 | 9/1977 | Bach et al. | 260/668 B |
| 4,092,268 | 5/1978 | de Zarauz . | |
| 4,518,753 | 5/1985 | Richards | 526/177 |

FOREIGN PATENT DOCUMENTS 1294890 11/1972 United Kingdom .

OTHER PUBLICATIONS

Article "Synthesis and Characterization of Functional Diene Oligomers in View of Their Practical Applications," Die Angewandte Makromolekulare Chemie 70 (1978)9–30 (Nr. 1032).

Article "Functionally Terminal Polymers via Anionic Methods," Schulz, Sanda and Willoughby, Chapter 27, Anionic Polymerization, Kinetics, Mechanisms and Synthesis, Symposium Series No. 166, American Chemical Society, Washington, D.C., 1981.

*Primary Examiner*—Arthur C. Prescott

[57] ABSTRACT

Liquid telechelic polymers are made from dienes and are produced via anionic polymerization. While having low molecular weight, for example less than 15,000, the telechelic polymers are generally gel-free, have high amounts of trans-1,4 structure, low vinyl unsaturation and low bulk viscosities. The liquid telechelic polymers are made utilizing a trimetallic initiator comprised of (1) an organopolylithium compound and (2) a complex of a trialiphatic substituted aluminum compound or derivative thereof and a barium salt of an organic alcohol.

10 Claims, No Drawings

LIQUID TELECHELIC POLYMERS HAVING HIGH 1,4-DIENE STRUCTURE

This application is a continuation of application Ser. No. 200,286, filed on May 31, 1988, of I. Glen Hargis, Hubert J. Fabris, John A. Wilson, and Russell A. Livigni, for "Liquid Telechelic Polymers Having High 1,4-Diene Structure."

FIELD OF THE INVENTION

The present invention relates to liquid telechelic polymers made from conjugated dienes with the polymers being characterized by having high trans and low vinyl unsaturation therein and low bulk viscosities. The polymers have such characteristics independent of chain length and are made by utilizing a trimetallic initiator which is comprised of an organopolylithium compound and a complex made from the barium salt of an organic alcohol and a trialiphatic substituted aluminum compound.

BACKGROUND ART

Heretofore, telechelic polymers made from dienes had various shortcomings or limitations arising from the polymerization process such as high solution viscosity, high bulk viscosity, high vinyl content which increased with lower molecular weight of the telechelic polymer, and the like. Often, gelation occurred. Such telechelic polymers were generally prepared utilizing only an organopolylithium initiator and a polar solvent to facilitate dissolution.

U.S. Pat. No. 3,278,508 to Kahle et al relates to the polymerization of conjugated dienes such as 1,3-isoprene to form rubbery polymers having a high percentage of cis-1,4-addition product and reduced solution viscosities utilizing an initiator of an organolithium in combination with an organoaluminum compound for producing high molecular weight polymers.

U.S. Pat. No. 3,664,989 to Petrov et al relates to a method of preparing a homopolymer or a copolymer having terminal functional groups from a conjugated diene or optionally with a styrene type monomer having a pre-set molecular weight wherein the polymerization is carried out in the presence of an alkali metal catalyst such as lithium, and a modifier obtained by reacting an alkali metal with a conjugated hydrocarbon and an organoaluminum compound.

U.S. Pat. No. 4,518,753 to Richards et al relates to a process for the anionic polymerization of a conjugated diene in the presence of RLi and a hindered triaryl boron or aluminum derivatives.

British Patent No. 1,294,890 to Petrov et al relates to the production of hydrocarbon polymers containing functional end groups by treating a conjugated diene polymer containing at the chain ends thereof organometallic groups of a metal of Group II or Group III of the Periodic Table but excluding a transitional metal, with a reagent selected from an alkylene oxide, carbon dioxide, oxygen, sulfur, and epichlorohydrin.

An article "Synthesis and Characterization of Functional Diene Oligomers in View of Their Practical Applications," Die Angewandte Makromolekulare Chemie, 70 (1978) 9-30 (Nr. 1032), relates to the utilization of various initiators for butadiene oligomerization.

An article "Functionally Terminal Polymers via Anionic Methods," Schulz, Sanda and Willoughby, Chapter 27, Anionic Polymerization, Kinetics, Mechanisms and Synthesis, Symposium Series No. 166, American Chemical Society, Washington, D.C., 1981, relates to reacting monoacetal polybutadienyl lithium with ethylene oxide or carbon dioxide. Dihydroxy or hydroxycarboxy terminated polymers are produced.

SUMMARY OF THE INVENTION

Low molecular weight liquid telechelic polymers made from dienes are produced having a low vinyl content and a low bulk viscosity by utilizing a trimetallic initiator. The metallic initiator contains an organopolylithium compound wherein the organic group is an aliphatic, an aromatic, or an alkyl substituted aromatic and desirably has two lithium groups therein. A preformed complex of a triorgano substituted aluminum and a barium salt of an organic alcohol is blended with the organopolylithium compound. In order to produce a Wittig ate complex [G. Wittig, Angewandte Chem., 70, 65 (1958)] of barium and aluminum, the mole ratio of the aluminum metal to the barium metal is approximately 3.5 to about 4.5 whereas the mole ratio of the barium metal to the lithium metal is approximately from about 0.1 to about 0.5. The initiators are generally contained in various organic solvents so that they are dispersed therein. The dienes are generally conjugated dienes having from 4 to about 8 carbon atoms or optionally are copolymers wherein the comonomer is a different conjugated diene and/or a vinyl substituted aromatic having from 8 to 12 carbon atoms such as styrene. Although low molecular weight polymers are produced, that is having a number average molecular weight of 15,000 or less, the vinyl content of the polymer or copolymer is generally less than 15 percent but greater than 1 percent based upon the total amount of cis, trans, and vinyl structural groups therein derived from the diene monomers. The organic functional groups of the telechelic polymer are added after polymerization of the diene and the optional vinyl substituted aromatic monomers and such functional groups can be acid groups, mercapto groups, amino groups, hydroxyl groups, halogen groups, and the like.

DETAILED DESCRIPTION OF THE INVENTION

The liquid telechelic polymers of the present invention are made from diene monomers and desirably conjugated dienes having from 4 to 12 carbon atoms and preferably from 4 to 8 carbon atoms with specific examples including isoprene, butadiene, 1,3-hexadiene, piperylene, and the like, with butadiene being preferred. Such dienes are well known to the art and to the literature and include various branched diene monomers such as 2,3-dimethyl-1,3-butadiene, 3-methyl-1,3-heptadiene, and the like. Although homopolymers are preferred, random and block copolymers can also be utilized. The comonomer is either one or more different conjugated dienes having from 4 to 8 carbon atoms and/or one or more vinyl substituted aromatics having from 8 to 12 carbon atoms such as styrene, alpha-methyl-styrene, p-tertiary butyl styrene, and the like, with styrene being preferred. The amount of vinyl substituted aromatic comonomer utilized is from about 0 to about 50 percent by weight and preferably from about 5 to about 25 percent by weight based upon the total weight of all of the comonomers and the diene monomer. The molecular weight of the liquid telechelic diene polymers of the present invention is generally low and hence the homopolymer or copolymer has a molecular weight of generally less than 15,000, desirably less than 5,000, and preferably less than 3,500, but has a minimum weight of at least 500. A molecular weight of from about 1,000 to about 2,000 is often utilized.

The polymers of the present invention are formed by polymerizing the above-noted diene monomers in the presence of an anionic initiator system. The initiator system is generally a two component blend containing three metallic compounds with one of the blend components being an organopolylithium compound. Although the lithium component can contain a plurality of lithium atoms therein such as three or four, two lithium atoms are preferred. The organo group is generally an aliphatic including cycloaliphatic, more desirably an alkyl, having from 2 to 12 carbon atoms and preferably from 2 to 8 carbon atoms, an aromatic or an aliphatic, desirably an alkyl, substituted aromatic having from 6 to 40 carbon atoms with from 6 to 30 carbon atoms being preferred. Examples of specific organo portions or groups of the lithium initiator component include divinyl benzene, diisopropenyl benzene, 1,1,4,4-tetraphenyl butane, 1,2-diphenylethene, 1,3-bis(phenylethenyl) benzene, 1,2-dibutyl-1,2-diphenylethene, isoprene, and the like. Generally, lithium adducts of oligomers or dimers are preferred wherein the number of repeating units in the oligomer is from 2 to about 10, with 2 to about 6 being preferred. The lithium adducts are generally made from dienes having from 4 to 12 carbon atoms, either straight-chained or branched, as for example 1,3-butadiene, isoprene, dialkyl-butadienes wherein the alkyl group contains from 1 to 3 carbon atoms such as 2,4-hexadiene, 2,5-dimethyl-2,4-hexadiene, 1,3,5-hexatriene allocimene, myrcene, and the like. An especially preferred difunctional lithium initiator is a dilithioisoprene oligomer having the following formula

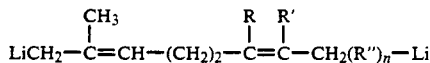

where

R = H or CH$_3$,

R' = CH$_3$ or H, with the proviso that R' is not the same as R

R" = 1,4 and 3,4 isoprene adducts, n = approximately 4.0

Average Molecular Weight = 432 when n = 4.0

The initiator is soluble in a mixture of cyclohexane and dimethylether at a molar equivalent ratio of 1 mole of dimethylether per mole of carbon-lithium bond.

The second component of the anionic initiator system is a preformed complex of a trialiphatic substituted aluminum compound and a barium salt of an organic alcohol. Each aliphatic group of the aluminum compound can independently contain from 1 to 20 carbon atoms, with from 2 to 4 carbon atoms being preferred. Desirably the aliphatic is an alkyl group. Examples of suitable aluminum compounds include trimethyl aluminum, triethylaluminum, tri-n-propyl aluminum, triisopropyl aluminum, pentyl diethyl aluminum, 2-methylpentyl-diethyl aluminum, tri-n-butyl aluminum, triisobutyl aluminum, dicyclohexylethyl aluminum, tri-n-pentyl aluminum, tri-n-hexyl aluminum, tri-n-octyl aluminum, tri(2-ethylhexyl)aluminum, tricyclopentyl aluminum, tricyclohexyl aluminum, tri(2,2,4-trimethylpentyl)aluminum, tri-n-dodecyl aluminum and tri(2-methylpentyl) aluminum and the like, with triethylaluminum being highly preferred.

The barium compound is actually the salt of an organic alcohol wherein the organic group is an aliphatic, desirably an alkyl, having from 1 to 15 carbon atoms and preferably from 2 to 10 carbon atoms; an aromatic, or an alkyl substituted aromatic having from 6 to 20 carbon atoms, with from 6 to 10 carbon atoms being preferred. Mixed alcohols can also be utilized. Examples of suitable alcohols include methanol, ethanol, propanol, isopropanol, n-butanol, cyclopentanol, cycloheptanol, cyclohexanol, s-butanol, t-butanol, allyl alcohol, pentanol, hexanol, octanol, decanol, phenol, nonyl phenol, diallyl alcohol, ditertiarybutyl alcohol, and the like, with diallyl alcohol being preferred.

The preformed aluminum/barium complex, that is the "ate" complex or component is formed by adding the two compounds together, generally suspended or dispersed in a solvent, and heating the same at a temperature of from about 75° C. to about 125° C. The mole ratio of the aluminum compound to the barium compound is generally from about 3.5 to about 4.5, desirably from about 3.7 to about 4.3, and preferably from about 3.95 to about 4.05. The complexing temperature is generally from about 50° C. to about 125° C. with about 80° C. being optimum.

The trimetallic anionic initiator system of the present invention is formed by mixing the organopolylithium component with the preformed complex component of the aluminum compound and the barium compound. The amounts of the two components are chosen such that the mole ratio of barium metal to lithium metal in the initiator is from about 0.10 to about 0.50, desirably from about 0.20 to about 0.40, and preferably from 0.22 to about 0.30. The obtained initiator system produces a low vinyl structure in the resulting diene polymer.

The lithium component and the preformed complex component of the anionic initiator system are generally dispersed in various nonaromatic hydrocarbon or nonpolar solvents. Suitable solvents include aliphatic solvents such as alkane solvents having from about 5 to about 20 carbon atoms, desirably from 5 to about 10 carbon atoms, with 6 carbon atoms being preferred, such as pentane, hexane, heptane, decane, and the like; as well as cycloaliphatic solvents having from 5 to 10 carbon atoms. Hexane, heptane or cyclohexane are preferred. Other hydrocarbon solvents include paraffinic hydrocarbon solvents such as various petroleum ethers and the like. Naturally, mixtures of the above solvents can also be utilized. The amount of solvent is not critical so long as a suitable amount is utilized to generally disperse or suspend the particular components of the anionic initiator system.

The amount of the anionic initiator system based upon the molar amount of the dilithium initiator compound is generally from about 0.2 to about 2.0 moles, desirably from about 0.35 to about 1.5 moles, and preferably from about 0.5 to about 1.0 mole for every 1,000 grams by weight of diene monomer and any optional vinyl substituted aromatic comonomer.

Polymerization of a diene monomer such as butadiene utilizing a dilithioisoprenyl dimethyl ether complex in the absence of the barium and aluminum complex results in a polybutadiene having from about 20 to about 40 percent vinyl content at a number average molecular weight of from 1,000 to 15,000. In contrast thereto, utilization of the anionic trimetallic initiator system of the present invention in the above-noted amounts produces low molecular weight polymers having unexpected and significantly low vinyl content therein. The amount of the vinyl content is generally 15 percent or less, desirably 12 percent or less, and preferably 10 percent or less based upon the total of all of the cis, trans, and vinyl structural groups in the polymers derived from diene monomers. That is, this percentage is based only upon portions or units of the polymer or copolymer made from diene monomers, and not from units or portions made from vinyl substituted aromatic comonomers. The amount of the trans structural groups, that is the trans-1,4 groups, is at least 65 percent and preferably at least 69 percent based upon the total of all of the cis, trans and vinyl structural groups in the polymers derived from diene monomers. Another unexpected result is that the bulk viscosity of the polymer itself is significantly reduced over heretofore made polymers derived from diene monomers. The bulk viscosity of the polymers (i.e., solvent free) of the present invention is generally 60 poise or less, desirably 45 poise or less, and preferably 30 poise or less at a molecular weight of about 1,000 and at a temperature of approximately 21° C. The solution viscosity is also low and thus improved processability is obtained.

The liquid telechelic polymers of the present invention generally can contain up to two organic functional groups. Various functional or endcapping groups can be chemically bonded to the terminal lithium portions of the polymer such as hydroxy groups, carboxylic acid groups, mercapto groups, amino groups, halogen groups, and the like. The functional or endcapping groups are added to the polymer by reacting a compound containing such groups with the polymer in the presence of an inert atmosphere. The addition of such functional or endcapping groups to lithium terminated polymers are well known to the art and to the literature. For example, polymers having hydroxyl endcapping groups can be prepared by reacting the lithium terminated polymer with various epoxides, aldehydes, or ketones. Acid end groups can be added by treating the polymer with carbon dioxide or with various cyclic anhydrides. Mercapto end groups are produced when sulfur, cyclic sulfides, or disulfides are utilized. Chlorine end groups can be prepared by reaction with chlorine. Amino end groups are added by reacting with mixtures of methoxyamine and methyl lithium, as well as with tertiary amino substituted aromatic aldehydes and ketones. Polymers containing hydroxyl or carboxylic acid functional end groups are preferred. The hydrocarbon portions of the various types of the above reaction compounds are known to the art and to the literature as for example as set forth in the references listed in Advances in Organometallic Chemistry, Stone & West, Volume 18, 1980, Academic Press, New York, New York, pages 89 through 93, by A. F. Halasa et al which is hereby fully incorporated by reference. Another article which sets forth various terminal telechelic end groups as well as the preparation thereof is set forth in the article "Telechelic Polymers–Precursors to High Solids Coatings," Progress In Organic Coatings, 7 (1979) 289–329, and is hereby fully incorporated by reference. Such endcapping compounds are reacted with the polymer obtained from diene monomers at temperatures of from about ambient for example 25° C. to about 100° C. and more desirably from about 25° C. to about 70° C. Such reaction, as noted, is carried out in an inert atmosphere such as argon or nitrogen with the proviso that oxygen or oxygen-containing compounds such as water, carbon dioxide, and air should be excluded since they would react with the initiator. The amount of functional or endcapping compounds utilized is generally a large excess to ensure that essentially all or substantially all of the lithium terminated polymers are reacted and contain a functional or endcapping group thereon. Typically, the mole ratio of the functional or endcapping compound to carbon-lithium of the lithium terminated polymers is at least 1.5, desirably greater than 2, and often from about 3 to about 4. Naturally, very large excesses, for example 20 or 30, can be utilized as when a carbon dioxide gas is utilized to add carboxylic acid end groups.

The liquid telechelic polymers of the present invention made from dienes have several advantages which clearly distinguish them from prior art polymers. A low process viscosity provides improved rheological behavior including efficient mixing with fillers such as aluminum and salts of perchloric acid, carbon black, calcium carbonate, magnesium silicate, silica, and the like. The generally high 1,4-structure and the associated low glass transition temperature (less than minus 65° C.) of the polymers of the present invention impart excellent low temperature elastomeric properties. Hence, the polymers of the present invention have application in situations requiring low vitrification temperatures. Since high amounts of trans-1,4- content or structure (about 70 percent) is contained within the polymers, they can provide low levels of crystallinity and provide networks with improved fatigue life and cut-growth resistance. Accordingly, the polymers of the present invention can be utilized as binders as for solid fuel rocket propellants, coatings, intermediates for polyurethanes, and the like.

The invention will be better understood by reference to the following description of the polymer characterization and examples.

Polymer Characterization

Composition and percent polybutadiene microstructure were obtained from $^{13}C$ NMR. Number average molecular weights were determined with a Hitachi vapor pressure osmometer. Hydroxyl content was determined by acetylation with acetic-1-$^{14}C$ anhydride, followed by isolation and radioassay of the product. Gel permeation chromatograms were obtained using a Waters High Performance Gel Permeation Chromatograph, Model 150C. Solutions at 0.5 weight percent in THF were injected onto columns at a flow rate of 1 ml/minute. The instrument oven and the differential refractometer were at 30° C. The column set (styragel) configuration used, as designated by Waters Associates, was $10^5 Å + 10^4 Å + 10^3 Å + 10^2 Å$.

All thermal transitions were obtained by differential scanning calorimetry (DSC) using a heating rate of 20° C./minute. Glass transition temperatures (Tg) were determined from the midpoint of the inflection in the plot of heat flow with temperature in the heating curve at a heating rate of 20° C./minute, obtained after quenching the sample from 125° C. to minus 150° C.

Bulk viscosity (poise) of the liquid polymers were determined with a Brookfield viscometer (20 rpm spindle rotation) at room temperature.

Gel content was determined in toluene using a Harris cage.

Williams Plasticity

The hydroxyl terminated polybutadienes were crosslinked with Desmodur L-2291A, 1,6-hexamethylene diisocyanate adduct of trimethylolpropane of functionality 3.0 from Mobay Chemical Company. Dibutyltin dilaurate was used as a catalyst. The materials were crosslinked in an oven at 80° C. for four hours. A Williams Plastometer was used to determine the plasticity, expressed in mils and taken after three minutes.

Functionality polymers were separated, antioxidant (1 phr A.O. 2246) added, and the products were recovered in a rotary evaporator. The predicted number-average molecular weight based on the ratio of incorporated butadiene, isoprene (initiator) and ethylene oxide to moles of carbon-lithium was 1020, compared to measured $M_n$ values of 975 and 1130 for Runs 1 and 2, respectively.

TABLE I

Preparation of Hydroxyl Terminated Polybutadiene with Ba/Al/DiLi

| Run No. | Polym.[a] Temp. (°C.) | Butadiene (grams) | Initiator[b] | | | Mole Ratios | | Ethylene Oxide (grams) | % Conv.[d] | % Vinyl |
|---|---|---|---|---|---|---|---|---|---|---|
| | | | Ba | Al | DiLi[c] | Al/Ba | Ba/Li | | | |
| 1 | 65 | 100 | 0.090 | 0.369 | 0.374 | 4.1 | 0.24 | 66 | 100 | 11 |
| 2 | 65 | 100 | — | — | 0.374 | — | — | 66 | 100 | 40 |

[a] polymerized in cyclohexane (380 g)
[b] moles per 100 g butadiene
[c] moles of carbon-lithium in solution of DiLi per 100 g butadiene
[d] based on 100 g butadiene, 74 g isoprene contributed by the initiator, and 16.8 g ethylene oxide incorporated as —CH$_2$CH$_2$OH per carbon lithium This entity was calculated from the ratio of number average molecular weight, determined with vapor pressure osmometry, and equivalent average molecular weight, determined by radiochemical assay of acetylated end groups containing carbon-14.

EXAMPLE 1

A hydroxy terminated polybutadiene (HTPB) was prepared with a Ba/Al/DiLi initiator system as shown in Table I. The trimetallic catalyst was prepared by the addition of a solution of dilithium (DiLi) oligomer (0.415 mM/g) of isoprene in cyclohexane (containing 3 weight percent dimethyl ether) to a solution of preformed Ba/Al complex in cyclohexane. This complex was obtained by adding a solution of triethylaluminum (2.17 mM/g) in cyclohexane to a suspension of barium diallyl oxide (0.213 mM/g) in cyclohexane and heating at 80° C. for 1 hour to provide a clear solution. A polybutadiene (Run 1, Table I) was prepared with this Ba/Al/DiLi catalyst in cyclohexane in a one liter glass bottle reactor. For comparison purposes, a control polybutadiene (Run 2, Table I) was obtained using only DiLi as the initiator. All polymerizations were quantitative and their solution viscosities in cyclohexane were nearly equivalent. However, the addition of ethylene oxide (4 moles per mole carbon-lithium) to the DiLi initiated polybutadiene (Run 2) produced an extremely viscous gel-like mass that did not flow at room temperature. The solution viscosity of the high-1,4 polybutadienyl anions of Run 1 was only slightly increased. It should be noted that upon addition of isopropanol (15 g), the solution viscosities of the hydroxyl polybutadienes of Runs 1 and 2 were reduced to the same level. The liquid polymers were recovered by treating the reaction mixture with citric acid (34 g) dissolved in a mixture of 4 liters water and 0.1 liter isopropanol. The resulting mixtures were allowed to stand for one hour and then the cyclohexane phase containing the liquid As apparent from Table I, Run 1 utilizing a trimetallic initiator of the present invention produced a hydroxyl terminated polybutadiene containing a significantly low amount, that is less than 11 percent by weight of vinyl groups based upon the total number of cis, trans, and vinyl groups within the polymer. In contrast thereto, Run 2 which utilized only a conventional organodilithium initiator of the prior art produced a polymer containing 40 percent by weight of vinyl groups therein.

EXAMPLE 2

A comparison of vinyl content, hydroxyl end group functionality and Tg of HTPB's of various molecular weights is shown in Table II. The polymers were prepared with the Ba/Al/DiLi catalyst system described in Example 1 and with the DiLi catalyst, as indicated in Table II. A polybutadiene (R-45HT) produced by Arco Chemical Co. and reported as a telechelic hydroxy terminated polybutadiene obtained by a free radical initiation [M. Kanakavel Makromol. Chem., 188,845 (1987)] is provided (in Run 7) for comparison purposes. The data clearly show that the use of the Ba/Al complex in combination with DiLi substantially reduces vinyl content and lowers Tg below the value obtainable with DiLi with no sacrifice in hydroxyl functionality. The extent of reduction in vinyl content is independent of molecular weight. The vinyl content of the HTPB's of this disclosure remains at about 10 percent for the limited range of molecular weights (975 and 1650) shown. For HTPB's prepared with DiLi, vinyl content increases from 28 to 40 percent with a decrease in molecular weight from 4500 to 1860. The data in Table II show that, for HTPB's with $M_n \leq 2000$, the level of vinyl unsaturation can be decreased from about 40 to 10 percent by the use of Ba/Al/DiLi catalyst. With the drop in vinyl content, a concomitant change in Tg from minus 50° C. to minus 65° C. can be seen.

TABLE II

| Run No. | Initiator[a] | Mole Ratio Al$^{3+}$/Ba$^{2+}$ | Mn | % Diene Structure | | | Tg, °C. | Hydroxyl Functionality |
|---|---|---|---|---|---|---|---|---|
| | | | | Vinyl | Trans | Cis | | |
| 1 | I | 4.0 | 975 | 11 | 69 | 20 | −66 | 1.5 |
| 2 | II | (DiLi alone) | 1130 | 40 | 38 | 22 | −50 | 1.5 |
| 3 | I | 4.2 | 1650 | 9 | 70 | 21 | −65 | 1.6 |
| 4 | II | (DiLi alone) | 1860 | 40 | 37 | 23 | −51 | 1.4 |
| 5 | II | (DiLi alone) | 2420 | 36 | 35 | 25 | −56 | 1.7 |
| 6 | II | (DiLi alone) | 4540 | 28 | 42 | 30 | — | 1.6 |

TABLE II-continued

| Run No. | Initiator[a] | Mole Ratio Al³⁺/Ba²⁺ | Mn | % Diene Structure Vinyl | Trans | Cis | Tg, °C. | Hydroxyl Functionality |
|---|---|---|---|---|---|---|---|---|
| 7[b] | III | — | 2800 | 20 | 60 | 20 | — | 2.3 |

[a] I - barium diallyl oxide/triethylaluminum with dilithium adduct of isoprene complexed with dimethyl ether
II - dilithium adduct of isoprene complexed with dimethyl ether
III - free radical
[b] HTPB (R-45HT) produced by Arco Chemical Company For anionic polymerization of diene monomers initiated by organolithium compounds in hydrocarbon solvents, a Poisson molecular weight distribution (MWD) is characteristic of polymers of high degrees of polymerization. The MWD distribution is often broadened for low molecular oligomers prepared with high concentrations of certain dilithio initiators; however, the degree of polydispersity is considerably less than for a corresponding radical initiated HTPB (R-45HT). A comparison of the data in Table III of HTPB's prepared with Ba/Al/DiLi and DiLi shows that the MWD's are nearly the same. Both anionic polymers have narrower MWD's than R45HT, as indicated by their $\overline{M}_w/\overline{M}_n$ values.

TABLE III

| Run No. | Initiator[a] | $\overline{M}_n$ | By HPGPC $\overline{M}_n$ | $\overline{M}_w$ | $\overline{M}_w/\overline{M}_n$ |
|---|---|---|---|---|---|
| 1 | I | 975 | 1400 | 2000 | 1.43 |
| 2 | II | 1130 | 1400 | 2200 | 1.57 |
| 7 | III | 2800 | 4670 | 13400 | 2.87 |

[a] See Table II for description of initiators

EXAMPLE 3

An HTPB was prepared according to Example 1 (Run 1) in the absence of the barium component utilizing an Al/DiLi (mole ratio =1/1) complex as the initiator system. The data in Table IV show that Al/DiLi can reduce the vinyl content from 40 to 25 percent as well as reduce the amount of trans-1,4 content to a level such that the polymer is amorphous, but it is considerably less effective than the Ba/Al/DiLi catalyst system for obtaining vinyl contents as low as 10 percent and a trans content as high as 70 percent at nearly the same molecular weight.

In addition to a low vinyl structure, the data in Table IV show a much higher trans/cis ratio of HTPB (Run 9) compared to HTPB's (Runs 4 and 8). The higher level of trans-1,4 placements in combination with a sufficient chain length may provide a crystallizable trans-HTPB telechelic with implications of improved elastomeric properties.

TABLE IV

| Run No. | Initiator[a] | Mole Ratio Al/Li | Ba/Li | $\overline{M}_n$ | % Diene Structure Vinyl | Trans | Cis | Tg, °C. | Hydroxyl Functionality |
|---|---|---|---|---|---|---|---|---|---|
| 4 | DiLi | — | — | 1860 | 40 | 37 | 23 | −51 | 1.4 |
| 8 | Al/DiLi | 0.86 | — | 1440 | 25 | 45 | 30 | −57 | 1.5 |
| 9 | Ba/Al/DiLi | 0.96 | 0.24 | 1490 | 9 | 71 | 20 | −65 | 1.5 |

EXAMPLE 4

As discussed in Example 1, when solutions of dilithium polybutadiene (Run 2) are reacted with ethylene oxide, the viscosity of the solution rises markedly and a stiff gel forms as a result of association of the polymeric electrolyte. In contrast to this behavior, solutions of polybutadiene (prepared with Ba/Al/DiLi) terminated with ethyleneoxide exhibit only a small increase in solution viscosity, such that the solution remains fluid. Thus, mixing problems associated with gelation can be avoided without resorting to the use of polar solvents to break up the association of ions.

As previously mentioned, low polymer viscosity is another characteristic of the telechelic high 1,4-polybutadienes. The data in Table V show that, at nearly the same number-average molecular weight and polydispersity values, there is a threefold decrease in polymer viscosity on going from 40 to 11 percent vinyl content. The lower viscosity of the low molecular weight HTPB's of this invention, largely accounted for by the reduced vinyl content, can provide obvious practical advantages in applications such as castable elastomers.

TABLE V

| Run No. | Initiator[a] | $\overline{M}_n$[b] | $\overline{M}_w/\overline{M}_n$[c] | % Vinyl | Tg, °C. | Viscosity, poise at 21° C. |
|---|---|---|---|---|---|---|
| 1 | I | 975 | 1.48 | 11 | −66 | 27 |
| 2 | II | 1130 | 1.53 | 40 | −50 | 84 |

[a] see Table II for description of initiators
[b] measured by vapor pressure osmometry
[c] measured by high performance gel permeation chromotography

EXAMPLE 5

The HTPB's of Example 1 were cured with an adduct of 1,6-hexamethylene diisocyanate and trimethylolpropane and catalyzed with dibutyltin dilaurate. A comparison of the Williams plasticity values (Table VI) at equivalent mole ratios (NCO/OH) demonstrates that the quality of the hydroxyl terminated polybutadienes of this invention are equivalent to the control material made with a dilithio compound as the sole initiator.

TABLE VI

| | RUN NO. 1 | 2 |
|---|---|---|
| Initiator | I | II |
| Hydroxyl Functionality | 1.5 | 1.5 |
| Williams Plasticity[a] (mils) | 340 | 310 |
| % Gel[b] | 85 | 83 |

[a] Values reported for polyurethanes prepared with a mole ratio (NCO/OH) of 1.1.
[b] In toluene.

While in accordance with the Patent Statutes, the best mode and preferred embodiment has been set forth, the scope of the invention is not limited thereto, but rather by the scope of the attached claims.

What is claimed is:

1. A liquid telechelic polymer comprising:

an organo functional terminated telechelic polymer, the organo functional group being hydroxyl, carboxyl, mercapto, amino, halogen, or combinations thereof, the telechelic polymer being the polymerization product of (a) a conjugated diene monomer having from 4 to 12 carbon atoms, (b) an optional different diene monomer having from 4 to 12 carbon atoms, and (c) an optional vinyl substituted aromatic monomer having from 8 to 12 carbon atoms, said telechelic polymer having a functionality of at least 1.4, a number average molecular weight of less than 15,000 and a vinyl structural unit content of less than 15 percent and a trans-1,4 content of at least 65 percent based upon the total number of vinyl, trans, and cis structural units in said telechelic polymer derived from the conjugated diene monomers.

2. A liquid telechelic polymer according to claim 1, wherein the amount of said optional vinyl substituted aromatic monomer is from about 0 to about 50 percent by weight based upon the total weight of all of the diene monomers and said optional vinyl substituted aromatic monomer.

3. A liquid telechelic polymer according to claim 2, wherein the molecular weight of said telechelic polymer is from about 500 to about 15,000, wherein the functionality of said telechelic polymer is at least 1.7, and wherein said vinyl structural unit content is 12 percent or less.

4. A liquid telechelic polymer according to claim 3, wherein the conjugated diene monomers have from 4 to 8 carbon atoms, wherein said telechelic polymer is a homopolymer, and wherein the molecular weight of said homopolymer is from about 500 to about 5,000.

5. A liquid telechelic polymer according to claim 4, wherein the molecular weight of said homopolymer is from about 1,000 to about 2,000, wherein said conjugated diene monomer is butadiene, and wherein said liquid telechelic polymer is a viscosity of 60 poise or less at 21° C.

6. A liquid telechelic polymer according to claim 5, wherein said organo functional group is hydroxyl, or carboxylic acid, wherein said vinyl structural unit content is 10 percent or less, and wherein said trans-1,4 content is at least 69 percent.

7. The liquid telechelic polymer of claim 1, made utilizing a trimetallic initiator, said trimetallic initiator comprising a blend of an organopolylithium component and a preformed complex component made from a trialiphatic substituted aluminum compound and a barium salt of an organic alcohol.

8. The liquid telechelic polymer of claim 2, made utilizing a trimetallic initiator, said trimetallic initiator comprising a blend of an organopolylithium component and a preformed complex component made form a trialiphatic substituted aluminum compound and a barium salt of an organic alcohol, wherein the mole ratio of the aluminum metal to the barium metal is from about 3.5 to about 4.5, wherein the mole ratio of said barium metal to the lithium metal is from about 0.10 to about 0.50, and wherein the amount of said trimetallic initiator is from about 0.2 to about 2.0 moles per 1000 grams of the monomers.

9. The liquid telechelic polymer of claim 4, made utilizing a trimetallic initiator, said trimetallic initiator comprising a blend of an organopolylithium component and a preformed complex component made from a trialiphatic substituted aluminum compound and a barium salt of an organic alcohol, wherein the organo portion of said organopolylithium component is an aliphatic having from 2 to 12 carbon atoms, an aromatic or an aliphatic substituted aromatic having from 6 to 40 carbon atoms, or an oligomer having from 2 to 10 repeat units made from a diene having from 4 to 12 carbon atoms, wherein the aliphatic portion of said trialiphatic substituted aluminum compound independently is an aliphatic having from 1 to 20 carbon atoms, wherein said organic alcohol is an aliphatic alcohol having from 1 to 15 carbon atoms, an aromatic or an alkyl substituted aromatic having from 6 to 20 carbon atoms, wherein the mole ratio of the aluminum metal to the barium metal is from about 3.7 to about 4.3, and wherein the mole ratio of said barium metal to the lithium metal is from about 0.20 to about 0.40.

10. The liquid telechelic polymer of claim 6, made utilizing a trimetallic initiator, said trimetallic initiator comprising blend of an organopolylithium component and a preformed complex component made from a trialiphatic substituted aluminum compound and a barium salt of an organic alcohol, wherein the organo portion of said organopolylithium component is an oligomer having from 2 to 10 repeat units made from a diene having from 4 to 12 carbon atoms, wherein the polylithium portion is dilithium, wherein the aliphatic portion of said trialiphatic substituted aluminum compound independently is an alkyl having from 2 to 4 carbon atoms, wherein said organic alcohol forming said barium salt is an aliphatic alcohol having from 2 to 10 carbon atoms, wherein the mole ratio of the aluminum metal to the barium metal is from about 3.95 to about 4.05, and wherein the mole ratio of said barium metal to the lithium metal is from about 0.22 to about 0.30.

* * * * *